(No Model.)

O. B. HALL & G. H. GRAVES.
NIPPLE HOLDER.

No. 523,722. Patented July 31, 1894.

Witnesses:
Walter E. Lombard.

Inventors:
Osborn B. Hall
George H. Graves
by J. W. Porter Atty

UNITED STATES PATENT OFFICE.

OSBORN B. HALL AND GEORGE H. GRAVES, OF MALDEN, MASSACHUSETTS; SAID HALL ASSIGNOR TO SAID GRAVES.

NIPPLE-HOLDER.

SPECIFICATION forming part of Letters Patent No. 523,722, dated July 31, 1894.

Application filed March 9, 1894. Serial No. 503,013. (No model.)

*To all whom it may concern:*

Be it known that we, OSBORN B. HALL and GEORGE H. GRAVES, of Malden, in the county of Middlesex and State of Massachusetts, have invented a new and useful Improvement in Nipple-Holders, which will, in connection with the accompanying drawings, be hereinafter fully described, and specifically defined in the appended claims.

Figure 1:
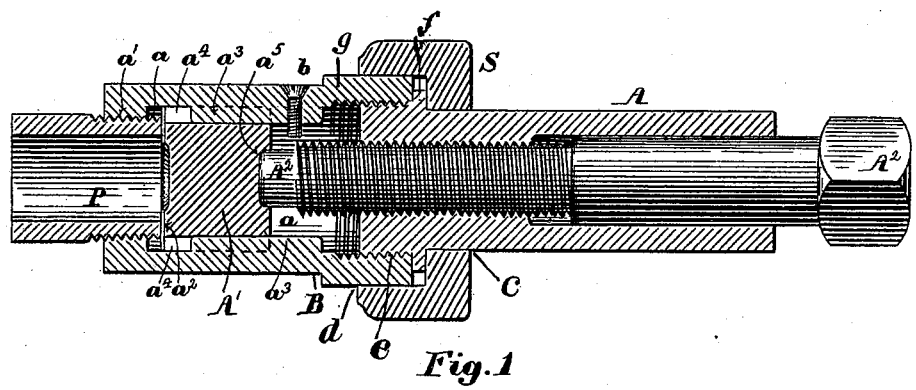
Figure 2:
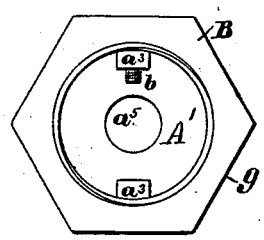
Figure 3:
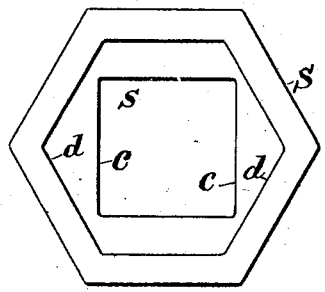
Figure 4:
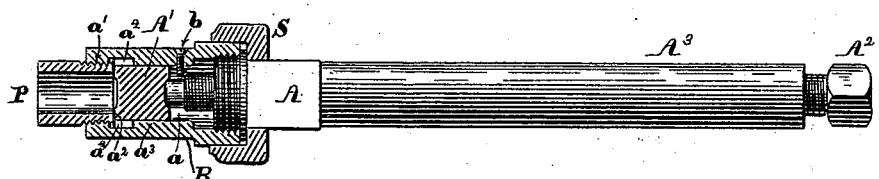

In said drawings: Figure 1. is a longitudinal section of a nipple holder embodying our invention. Fig. 2. is a detached end elevation of the nipple holding socket, taken as viewed from the right of Fig. 1. Fig. 3. is an end elevation of the sleeve that interlocks the main part A and the socket B, taken as viewed from the left in Fig. 1. Fig. 4. shows the nipple holder represented in Fig. 1 as modified for use in a nipple threading machine.

The nature of our machine is to hold the nipple blank by its previously threaded end, while the other end is being threaded; and this whether the two ends of the nipple are to have both right or left hand threads, or whether one end is to be threaded right handed and the other left handed. And it consists in the devices and the combinations thereof that will be next herein described and then specified in the claims.

Referring again to said drawings, A is the body of the nipple holder, which is rectangular in cross section so as to be held in a vise, and is for convenience four sided as indicated at $c, c$ of collar S, Fig. 3. Usually, and preferably, a socket B is secured to A, by screw threads $e$; the socket bearing against collar $f$ formed upon part A. The rear part of socket B, shown at $g$ is formed rectangular to fit in the larger end of collar S, as indicated at $d, d$, Fig. 3; said part $g$ being preferably formed hexagonal in cross section. Said socket B is chambered, as at $a$; it is threaded as at $a'$ to receive the threaded end of nipple P, which nipple is held from rotation while in socket B by the holder A' which is formed with end teeth $a^2$ and is held from rotation by the interior ribs $a^3$ which engage in slots $a^4$ formed in said holder A'. Said holder is actuated and adjusted against nipple P by the central screw $A^2$ threaded in A, and acting in recess $a^5$ formed in the back side of A'. Upon the square portion of A, I arrange the collar S formed with the smaller passage $c$ to slide readily on A, and also formed with the larger recess $d$ that fits loosely upon the collar $g$ as shown.

It is apparent, that whether the last end of nipple P is cut with a thread in the same direction as the first end, or in the opposite direction, that the toothed end of holder A' will prevent the nipple from turning relatively to said holder; and that the ribs $a^3$ fitting in slots $a^4$ prevent said holder from turning in socket B, while the collar S fitting the rectangular part of body A and also of part $g$ of said socket, prevents the socket from turning relatively to part A. Said part A as shown in Fig. 1, is adapted to be held in a vise; while in Fig. 4 it is formed with a round extension $a^3$ by which it may be used in a pipe threading machine. The screw $b$, inserted through one of the ribs $a^3$ prevents holder A' from moving out of place when the nipple holder is not in use. The parts A, B, A', and $A^2$, may be formed in any desired manner, so long as parts A and B are formed to be interlocked by means of collar S or by any equivalent means, so that part B is held from rotation relatively to part A.

What we claim as our invention, and desire to secure by Letters Patent, is—

1. The combination in a nipple holder of body A, with the socket B held thereon from longitudinal motion and having provision for holding the nipple, and collar S adapted to hold the socket from rotation with reference to the body, substantially as set forth.

2. The combination in a nipple holder of body A formed rectangular in cross section, socket B thereto secured and adapted to hold the nipple, and formed with enlarged portion $g$ hexagonal in cross section, and collar S, formed upon its interior to engage both said parts A and $g$, and secure the same from rotation, substantially as set forth.

OSBORN B. HALL.
GEORGE H. GRAVES.

Witnesses:
THOMAS W. PORTER,
EUGENE HUMPHREY.